(12) United States Patent
Danley

(10) Patent No.: US 12,467,892 B2
(45) Date of Patent: Nov. 11, 2025

(54) ZONE BOX FOR A DIFFERENTIAL SCANNING CALORIMETER

(71) Applicant: TA Instruments-Waters LLC, New Castle, DE (US)

(72) Inventor: Robert L. Danley, Collingswood, NJ (US)

(73) Assignee: TA Instruments-Waters LLC, New Castle, DE (US)

(*) Notice: Subject to any disclaimer, the term of this patent is extended or adjusted under 35 U.S.C. 154(b) by 427 days.

(21) Appl. No.: 17/897,282

(22) Filed: Aug. 29, 2022

(65) Prior Publication Data

US 2023/0104380 A1    Apr. 6, 2023

Related U.S. Application Data

(60) Provisional application No. 63/252,881, filed on Oct. 6, 2021.

(51) Int. Cl.
*G01N 25/48* (2006.01)

(52) U.S. Cl.
CPC ....... *G01N 25/482* (2013.01); *G01N 25/4833* (2013.01); *G01N 25/4866* (2013.01)

(58) Field of Classification Search
CPC ............. G01N 25/482; G01N 25/4833; G01N 25/4866; G01K 3/14; G01K 7/02;
(Continued)

(56) References Cited

U.S. PATENT DOCUMENTS

| 4,350,446 A | * | 9/1982 | Johnson | G01N 25/4826 374/13 |
| 6,079,873 A | * | 6/2000 | Cavicchi | G01N 25/4866 422/51 |

(Continued)

FOREIGN PATENT DOCUMENTS

| CN | 104155512 A | * | 11/2014 |
| JP | S5746837 U | | 3/1982 |

OTHER PUBLICATIONS

International Search Report and Written Opinion in PCT/US2022/041802 mailed on Dec. 2, 2022.
(Continued)

*Primary Examiner* — Kristina M Deherrera
*Assistant Examiner* — Evan Mancini
(74) *Attorney, Agent, or Firm* — Schmeiser, Olsen & Watts LLP; William G. Guerin, Esq.

(57) ABSTRACT

Described is a zone box for a differential scanning calorimeter. The zone box includes sheets of thermocouple alloy disposed between thermally conductive electrical insulator layers. A thermocouple alloy wire is electrically coupled to each one of the thermocouple alloy sheets. In addition, a pure metal wire is electrically coupled to each one of the thermocouple alloy sheets to enable remote measurement of voltage differences between the different thermocouple alloy sheets. The high thermal conductivity of the electrical insulator layers substantially reduces any thermal gradients across the sheets and maintains the connections of the thermocouple alloy wires and pure metal wires to the sheets to be at substantially the same temperature. The zone box reduces temperature difference measurement errors that result from inhomogeneity in the thermocouple alloy wires and variable temperature distributions along the length of the wires.

17 Claims, 12 Drawing Sheets

(58) Field of Classification Search
CPC .......... G01K 7/021; G01K 7/023; G01K 7/10;
G01K 7/12; G01K 17/04
USPC ..................................................... 374/31, 30
See application file for complete search history.

(56) References Cited

U.S. PATENT DOCUMENTS

| | | | |
|---|---|---|---|
| 6,431,747 B1* | 8/2002 | Danley | G01N 25/4833 |
| | | | 374/33 |
| 6,641,300 B1* | 11/2003 | Lacey | G01K 19/00 |
| | | | 374/E19.001 |
| 7,470,057 B2 | 12/2008 | Danley | |
| 2008/0080591 A1* | 4/2008 | Tanaka | G01K 7/02 |
| | | | 374/E7.004 |
| 2011/0188534 A1* | 8/2011 | Nishimura | G01N 25/4866 |
| | | | 374/33 |
| 2020/0064209 A1 | 2/2020 | Danley | |

OTHER PUBLICATIONS

International Preliminary Report on Patentability in PCT/US2022/041802 mailed on Apr. 18, 2024.
Examination Report in European Patent Application No. 22772737.7 mailed on Jul. 17, 2025.

* cited by examiner

ZONE BOX FOR A DIFFERENTIAL SCANNING CALORIMETER

RELATED APPLICATION

This application claims the benefit of the earlier filing date of U.S. Provisional Patent Application Ser. No. 63/252,881 filed Oct. 6, 2021 and titled "Zone Box for a Differential Scanning calorimeter," the entirety of which is incorporated herein by reference.

FIELD OF THE INVENTION

The disclosed technology relates generally to differential scanning calorimetry. More particularly, the technology relates to a zone box for a heat flux differential scanning calorimetry cell.

BACKGROUND

Differential scanning calorimetry (DSC) is a type of dynamic calorimetry where the temperature of a sample under investigation and a reference are controlled to change with respect to time in a desired way. The change in temperature of the sample causes heat to flow to or from the sample. Conventional DSC instruments, such as a twin calorimeter, include two essentially identical calorimeters (i.e., a sample calorimeter and a reference calorimeter) situated within a same controlled temperature calorimeter enclosure for measuring the heat flowing to and from the sample. The sample to be analyzed is placed in the sample container installed on the sample calorimeter and an inert reference sample may be placed in the reference container installed on the reference calorimeter; however, in many instances, the reference container is empty. The heat flow rate to the sample and the sample container is measured by the sample calorimeter and the heat flow rate to the reference sample, if used, and the reference container is measured by the reference calorimeter. The heat flow rate measured by the reference calorimeter is subtracted from the heat flow rate measured by the sample calorimeter to obtain the heat flow rate to the sample.

DSC may be classified as either heat flux or power-compensation. In heat flux DSC, the temperature difference between the sample and reference calorimeters varies as the rate of heat flowing into or out of the sample changes with sample temperature. In power-compensation DSC, the temperature difference between the sample and reference calorimeters is reduced or eliminated by differential heating of the sample calorimeter with respect to the reference calorimeter. In either case, a small temperature difference between sample and reference calorimeters is the principal measurement and the performance of DSC depends on the precision of the measurement of that small temperature difference.

Variations of the thermoelectric output voltage of the thermocouples that are used to measure the temperature difference of the sample and reference calorimeters can negatively affect measurement precision. Thermocouples are generally constructed of metal alloys and consequently the thermoelectric output voltage can be adversely affected by inhomogeneity inherent in alloys. Further, the thermoelectric output voltage of a thermocouple may vary over time especially when the thermocouple is exposed to elevated operating temperatures and when the thermocouple oxidizes. In addition, the thermoelectric output voltage may change when thermocouple elements are subject to strain, especially when the strain results in permanent plastic deformation.

SUMMARY

In one aspect, a zone box for a differential scanning calorimeter includes a plurality of thermocouple alloy sheets, a first and a second thermally conductive electrical insulator layer and a plurality of thermocouple alloy wires. Each thermocouple alloy sheet is formed of a thermocouple alloy. The first and second thermally conductive electrical insulator layers are disposed on opposite sides of the plurality of thermocouple alloy sheets. Each thermocouple alloy wire is electrically coupled to a respective one of the thermocouple alloy sheets and is formed of the same thermocouple alloy as the respective one of the thermocouple alloy sheets.

All the thermocouple alloy sheets may be formed of the same thermocouple alloy.

At least one of the thermocouple alloy sheets and the first and second thermally conductive electrical insulator layers may include at least one hole to pass an additional thermocouple alloy wire.

Each of the thermocouple alloy wires may be electrically coupled to a side of a respective one of the thermocouple alloy sheets and the zone box may further include, for each of the thermocouple alloy sheets, a pure metal wire electrically coupled to a same side of the respective one of the thermocouple alloy sheets. Each of the pure metal wires may be electrically coupled to the respective one of the thermocouple alloy sheets at a location that is proximate to the locations where the other pure metal wires are electrically coupled to the other thermocouple alloy sheets. Each of the pure metal wires may be a gold wire.

The plurality of thermocouple alloy wires may include a first thermocouple alloy wire included in a first thermocouple disposed to measure a temperature of a sample calorimeter and a second thermocouple wire included in a second thermocouple disposed to measure a temperature of a reference calorimeter. The plurality of thermocouple alloy wires may further include a third thermocouple wire included in a thermocouple disposed to measure a temperature of a differential scanning calorimeter sensor base.

At least one of the first and second thermally conductive electrical insulator layers may include a ceramic material. The ceramic material may be beryllium oxide or aluminum nitride.

Each of the first and second thermally conductive electrical insulator layers may have a thermal conductivity of at least 100 W/mK.

In another aspect, a method for performing a differential scanning calorimeter measurement includes the step (step a) of providing a zone box for a differential scanning calorimeter having a sample calorimeter, a reference calorimeter and a sensor base. The zone box includes a first thermocouple alloy sheet, a second thermocouple alloy sheet and a third thermocouple alloy sheet, each of the thermocouple alloy sheets formed of a same thermocouple alloy. A first voltage is measured (step b) between the first thermocouple alloy sheet and the second thermocouple alloy sheet and a temperature difference is determined (step c) between the sample calorimeter and the reference calorimeter based on the measured first voltage.

The measuring of the first voltage according to step b may include measuring a voltage between two pure metal wires each in electrical communication with a respective one of the first and second thermocouple alloy sheets.

The method may further include a step (step d) of changing a temperature of a sample container and a temperature of a reference container of the differential scanning calorimeter and a step (step e) of repeating steps b and c. The method may further include iteratively performing steps d and e.

The method may further include measuring a second voltage between the first thermocouple alloy sheet and the third thermocouple alloy sheet and determining a temperature difference between the sample calorimeter and the sensor base based on the measured second voltage.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

Figure 1:
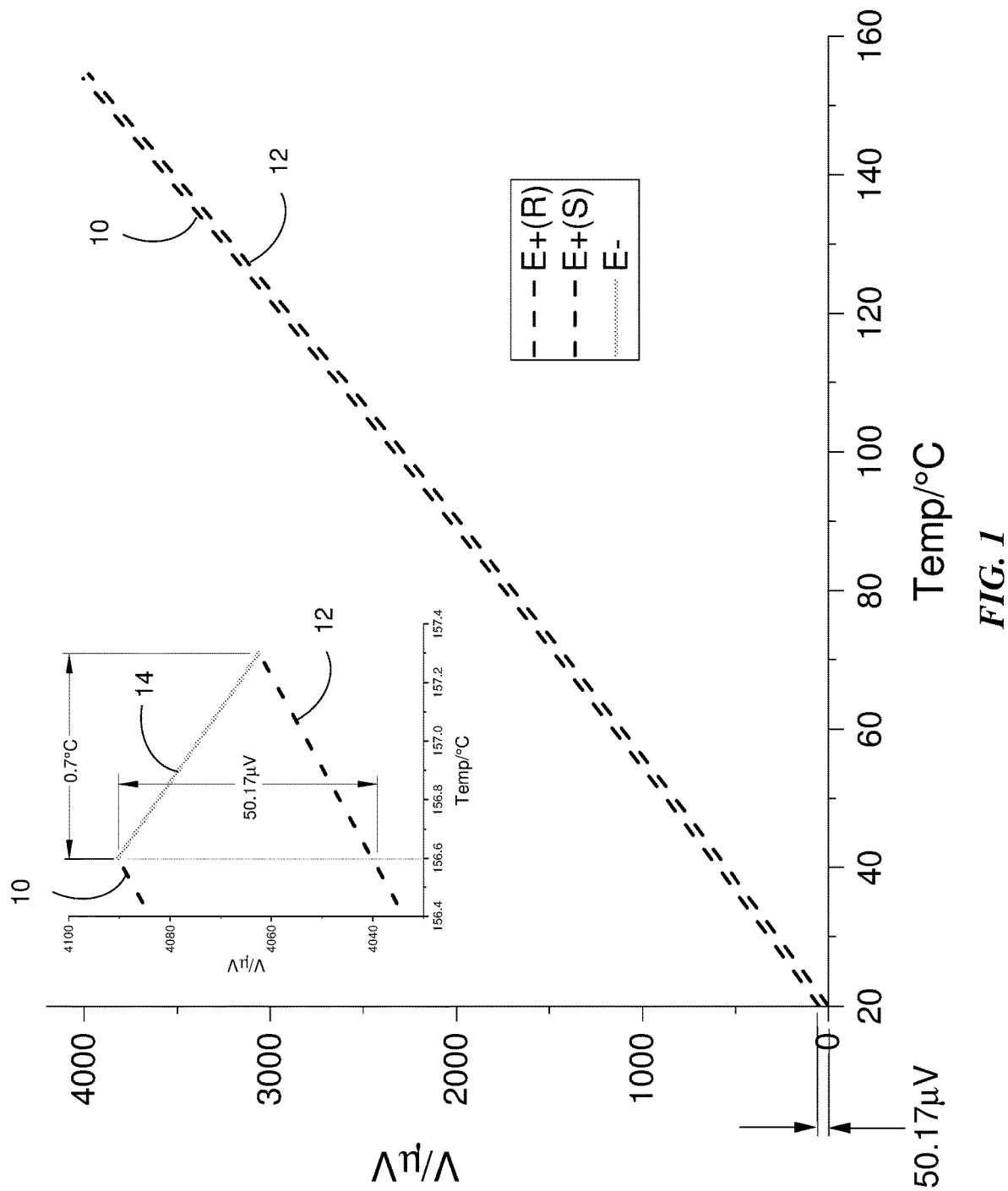
FIG. 1 is a graphical representation of voltage versus temperature for a temperature difference measurement in a heat flux DSC.

Reference in the specification to an embodiment or example means that a particular feature, structure or characteristic described in connection with the embodiment or example is included in at least one embodiment or example of the teaching. References to a particular embodiment or example within the specification do not necessarily all refer to the same embodiment or example.

The present teaching will now be described in detail with reference to exemplary embodiments or examples thereof as shown in the accompanying drawings. While the present teaching is described in conjunction with various embodiments and examples, it is not intended that the present teaching be limited to such embodiments and examples. On the contrary, the present teaching encompasses various alternatives, modifications, and equivalents, as will be appreciated by those of skill in the art. Those of ordinary skill having access to the teaching herein will recognize additional implementations, modifications, and embodiments, as well as other fields of use, which are within the scope of the present disclosure as described herein.

In brief overview, embodiments and examples disclosed herein are directed to a zone box for a differential scanning calorimeter. The zone box includes a unique configuration of sheets of thermocouple alloy disposed between thermally conductive and electrically insulating layers. Thermocouple alloy wires are electrically coupled to respective thermocouple alloy sheets and pure metal wires (e.g., gold wires) are electrically coupled to the thermocouple alloy sheets to allow for voltage differences between different sheets to be sensed remote to the sheets. Advantageously, use of the zone box in a DSC instrument reduces temperature difference measurement errors that result from inhomogeneity in the thermocouple alloy wires and variable temperature distributions along the length of the wires.

Thermocouples generate a voltage that is proportional to the temperature difference between the measuring junction and the terminations at the measurement end of the wires. The electrical output of a thermocouple is the sum of the contributions from each of the lengths of material comprising the circuit. It may be described by the equation $$\Delta V = \int_{T_t}^{T_m} S_1(T) dT + \int_{T_m}^{T_t} S_2(T) dT \tag{1}$$

where, $T_t$ is the temperature at the terminal ends of the thermocouple, $T_m$ is the temperature at the measuring junction where the thermoelements are joined and $S_1$ and $S_2$ are the Seebeck coefficients of the two wires of the thermocouple which depend on the wire temperature T The wire temperature varies along the length of each wire depending on how the wires are installed and operated. Temperature is determined from the measured voltage by using thermocouple tables that give the temperature for a given voltage with appropriate adjustment to account for the temperature $T_t$ of the terminals of the thermocouple. The adjustment to account for the terminal temperature is known as reference junction compensation. Reference junction compensation is required because standard thermocouple tables are created using 0° C., the temperature of an ice bath, as the reference junction temperature. Thermocouple tables are based on standard values of the thermoelectric output, for example thermocouple tables published by the National Institute of Standards and Technology (NIST), an agency of the US Department of Commerce. Thus, if the thermoelectric output voltage of the thermocouple wires does not match the standard for the thermocouple, the measured temperature will be incorrect. Many factors can cause thermoelectric output of wires to differ from the standard values. The wire may not be homogeneous and the inhomogeneity is typically a greater problem for finer wires. The wire is often subject to strains that create cold-worked areas in the wire and thermoelectric output in those areas often does not match the standard values. The thermoelectric output voltage of a thermocouple changes over time, especially if the thermocouple is exposed to operating conditions at the higher end of the thermocouple operating temperature range. Such errors may be corrected by calibration.

To measure a temperature difference, three thermoelements are used so that there are two temperature measuring junctions, $T_s$ and $T_r$ and the voltage representing the difference between the two temperature measuring junctions is measured at the terminals of two thermoelements that are at the same temperature. The thermocouple circuit may comprise two positive thermoelements connected by a negative thermoelement where the measuring junctions are the connections between the positive and the negative thermoelements and the voltage is measured at the terminals of the positive thermoelements. Alternately, the thermocouple circuit may comprise two negative thermoelements connected by a positive thermoelement where the measuring junctions are the connections between the positive and the negative thermoelements and the voltage is measured at the terminals of the negative thermoelements. The magnitude of the measured voltage difference is the same for both configurations provided that the positive and negative thermoelements have the same composition. The voltage representing the temperature difference between the two measuring junctions is given by the equation $$\Delta V = \int_{T_t}^{T_r} S_1(T)dT + \int_{T_r}^{T_s} S_2(T)dT + \int_{T_s}^{T_t} S_1(T)dT \quad (2)$$

where $T_t$ is the temperature at the terminal ends of the pair of wires of the same thermoelement, $T_s$ is the temperature at one of the measuring junctions and $T_r$ is the temperature at the other measuring junction. The temperature T along each thermoelement is determined by the installation of the thermocouple and depends on the temperature of the surroundings of the thermocouple circuit and heat exchange between the circuit and the surroundings. For example, if the thermocouple is installed within a furnace to measure a furnace temperature, the thermocouple passes through the furnace wall and extends to a termination point. Thus, there is a variation of temperature along each thermoelement passing through the wall that causes a varying voltage to occur along the length of the thermoelement.

FIG. 1 is a graphical representation of voltage versus temperature for a temperature difference measurement in a heat flux DSC near the peak of an indium melt at 156.6° C. The thermocouple is type E chromel vs constantan where the thermoelement that generates an increasing voltage with increasing temperature (the positive element, E+) is chromel and the thermoelement that generates a decreasing voltage with increasing temperature (the negative element, E−) is constantan. Chromel is an alloy comprising nickel alloyed with 10% chromium and constantan is an alloy comprising copper alloyed with 45% nickel. The voltage developed along each thermocouple element is plotted as a function of temperature. The wire coupled to the reference temperature measuring junction is grounded and represents zero voltage. Dashed black lines 10 and 12 indicate the voltages for the E+ thermoelements for the sample and reference, respectively, and solid gray line 14 indicates the voltage for the E− thermoelement. The temperature of the sample measuring junction is 156.6° C., which is the melting point of indium, and the temperature of the reference measuring junction is 157.3° C., giving a temperature difference of 0.7° C. The temperature of the terminals of the two E+ thermoelements, where the voltage is measured, is 20° C. Each of the three integrals in equation 2 is the voltage developed across a leg of the circuit between the ends of a corresponding one of the thermoelements. The inset plot shows the voltage and temperature near the measuring junctions in expanded scale for clarity. The first term of the integral may be taken in two parts, between $T_t$ and $T_s$ and between $T_s$ and $T_r$, and the equation may be rewritten as $$\Delta V = \int_{T_t}^{T_s} S_1(T)dT + \int_{T_s}^{T_r} S_1(T)dT + \int_{T_r}^{T_s} S_2(T)dT + \int_{T_s}^{T_t} S_1(T) dT \quad (3)$$

where it will be noted that the first and last terms are equal in magnitude but have opposite sign because the limits of integration are reversed. Consequently, the first and last terms cancel and the temperature difference measurement is therefore the same as the temperature measurement in equation 1 where the measuring junction temperature is 157.3° C. and the terminal temperatures are 156.6° C. The graph shows that the voltage difference across the reference E+ thermoelement between 20° C. and 157.3° C. is 4062.44 µV, the voltage difference across the sample E− thermoelement between 157.3° C. and 156.6° C. is 27.89 µV and the voltage difference across the sample E+ thermoelement between 156.6° C. and 20° C. is −4040.16 µV. Thus, the sum of these three voltage differences is 50.17 µV, corresponding to the 0.7° C. temperature difference between the sample and reference measuring junctions. The voltage measured at the terminals of the E+ thermocouple element is converted to temperature using the Seebeck coefficient of the thermocouple pair at the sample temperature $T_s$. To measure that temperature difference correctly, the voltage across the reference and sample E+ thermoelements between $T_t$ and $T_s$ should be identical, that is, the magnitude of the integrals of the Seebeck coefficient between $T_r$ and $T_s$ for those two elements of the circuit should be identical. The measured temperature in a DSC experiment typically covers a broad range of temperatures, therefore the Seebeck coefficient of the thermoelements should match over the entire length of both thermoelements and not vary during operation. Differences between the thermoelectric output voltage of the two E+ thermoelements can result in errors in measuring the temperature difference between the sample and reference calorimeters in the DSC that will yield errors in the measured heat flow rate.

The thermoelements are alloys that may be inhomogeneous and exhibit drift of their thermoelectric output with time and temperature. Thermocouples made from pure metals do not exhibit this problem; however, thermocouples formed from pure metals have lower electrical output which results in substantially lower sensitivity where sensitivity is defined as the voltage developed per unit of temperature. The Seebeck coefficient has units of voltage/temperature (e.g., µV/° C.) and is an indication of sensitivity. A higher Seebeck coefficient indicates a greater sensitivity. The type E thermocouple pair, chromel vs constantan, has the greatest sensitivity of the metal thermocouples. Referring again to FIG. 1, the same voltage difference can be measured between the sample and reference E+ wires at any temperature between the terminal temperature $T_t$ and the sample temperature $T_s$ if the measurement is made at the same temperature for both wires. A zone box, which includes an alloy thermocouple connected to unalloyed lead wires inside a uniform temperature enclosure, provides a means to combine the greater sensitivity of the alloy thermocouple with the stability of pure metal lead wires to reduce errors in measuring temperature difference due to inhomogeneity, cold-working and drift of the thermocouple materials resulting from thermal history. Pure metal wires may be substituted for the thermocouple alloy wires with no change in the measured signals if both terminations are at the same temperature, that is, within a zone box having a uniform temperature.

Figure 2:
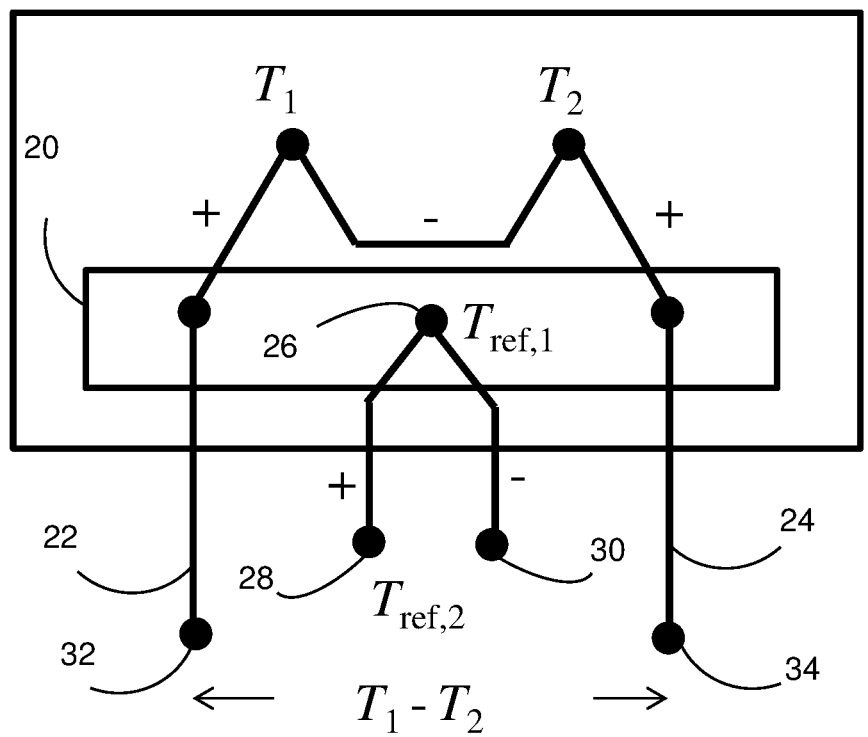
FIG. 2 is a schematic representation of a zone box for measurement of a temperature difference between two thermocouples.

FIG. 2 is a schematic depiction of the use of a zone box (rectangle 20) for measuring a temperature difference between two thermocouples with high precision. $T_1$ and $T_2$ represent the temperatures at two thermocouple junctions used to measure two temperatures that are close in value. The "+" and "−" indicate the positive and negative alloy thermocouple materials. Pure metal lead wires 22 and 24 are connected to the + thermocouple alloy inside the uniform temperature zone box 20, $T_{ref,1}$ is the temperature at the junction 26 of a thermocouple used to measure the zone box temperature and $T_{ref,2}$ is the temperature at the terminals 28 and 30 of the zone box thermocouple 26 where the reference junction compensation is applied to determine $T_{ref,1}$ from thermocouple tables. The voltage representing $T_1$-$T_2$ is measured at the terminals 32 and 34 which are at the same temperature. The voltage difference is converted to a temperature difference using the Seebeck coefficient of the thermocouple pair at the temperature $T_{ref,1}$. The pure metal lead wires 22 and 24 may be any unalloyed metal, such as pure copper, platinum or gold. Compatibility of materials should be considered, especially when using the thermocouple at high temperatures, as the alloy thermocouple is connected to the lead wire 22 and 24.

Employing a zone box in heat flux DSC instrument to reduce temperature difference errors resulting from thermocouple inhomogeneity and drift requires that the zone box be incorporated into a DSC enclosure close to the calorimetric sensor used for the temperature difference measurements. U.S. Pat. Nos. 6,431,747 and 7,470,057 disclose heat flux DSC sensors and heat flow rate measurement methods that utilize two differential temperature thermocouples to measure heat flow rate. Described herein is the application of a zone box for a DSC instrument that may employ sensors and utilize methods as disclosed in these two patents; however, it will be recognized that examples of zone boxes and methods described herein are applicable to a DSC instrument that uses a single differential temperature measurement or a multiplicity of temperature difference measurements and to single sample or multiple sample DSC instruments such as those disclosed in US patent publication no. 2020/0064209.

Figure 3:
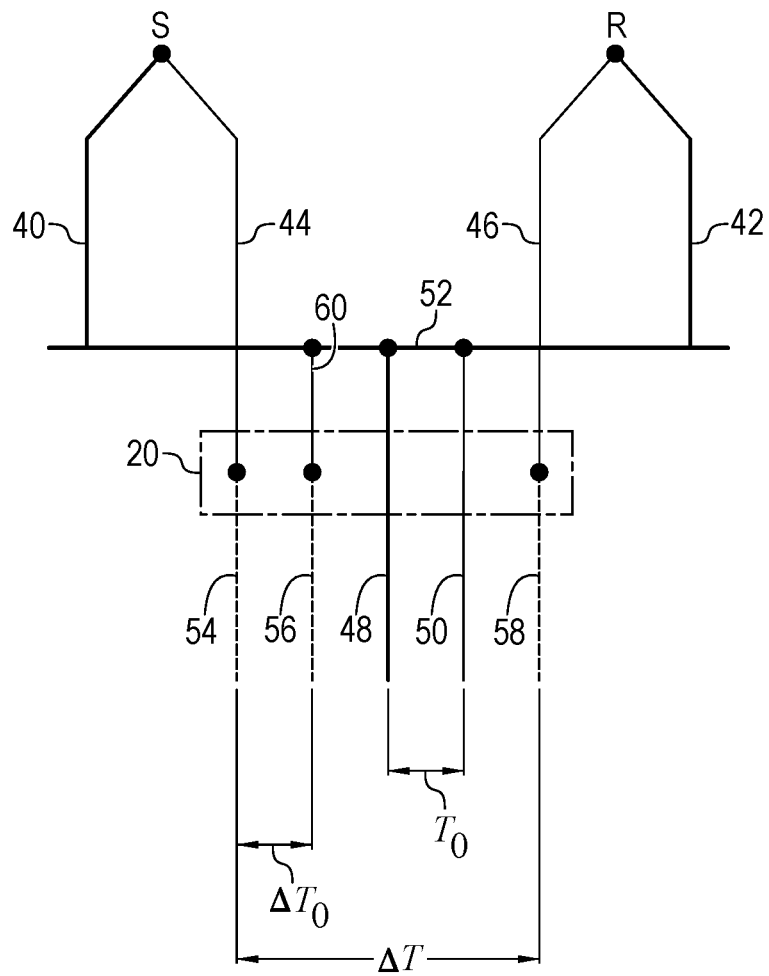
FIG. 3 is a schematic representation of a thermocouple arrangement for a heat flux DSC instrument utilizing a zone box.

FIG. 3 is a schematic depiction of a thermocouple configuration for a heat flux DSC instrument using a DSC sensor, such as disclosed in U.S. Pat. No. 6,431,747, with a zone box to facilitate the connection of the thermocouple alloy wires to pure metal lead wires. Lines 40 and 42 indicate the sample and reference E− constantan thermocouple alloys, respectively, lines 44 and 46 indicate the sample and reference E+ chromel alloys, respectively, and lines 48 and 50 indicate the E− constantan alloy and E+ chromel alloy, respectively, extending from the E− constantan alloy sensor base 52. Dashed lines 54, 56 and 58 indicate gold lead wires and dashed rectangle 20 indicates the zone box. The letters "S" and "R" indicate the junctions of the sample and reference thermocouples used to measure the temperatures of the sample and reference calorimeters, respectively.

The configuration shown in FIG. 3 differs from the configurations disclosed in U.S. Pat. Nos. 6,431,747 and 7,470,057 in that the illustrated configuration includes an additional (fifth) wire 60. The E+ wire of the $T_0$ thermocouple that measures the temperature of the sensor base (i.e., the base thermocouple) as disclosed in the two above-referenced patents is also one of the $\Delta T_0$ wires 50; however, the configuration shown in FIG. 3 includes the additional E+ wire 60 connected to the sensor base 52 and is used to determine $\Delta T_0$, the temperature difference between the sample calorimeter and the sensor base 52. The additional E+ wire 60 is connected to the gold lead wire 56 in the zone box 20. The E+ wire 50 of the $T_0$ thermocouple cannot be used by the $\Delta T_0$ thermocouple because the E+ wire 50 and E− wire 48 of the $T_0$ thermocouple are continuous to their terminations that are coupled to the temperature amplifier where the reference junction compensation is applied. Temperature $T_0$, like temperature $T_{ref,1}$ in FIG. 2, is used to determine the value of the Seebeck coefficient used to convert the voltages corresponding to $\Delta T$ and $\Delta T_0$ to temperature differences.

In one embodiment, the zone box comprises a high thermal conductivity plate of dielectric material having pure metal traces on one surface. For example, the high thermal conductivity plate may have a thermal conductivity of at least 100 W/mK. The thermocouple alloy wires are attached electrically and thermally to the metal traces and the pure metal lead wires are attached electrically to the traces. The metal traces applied to the dielectric material are formed from the same metal as the lead wires. The dielectric plate is housed within a cavity in the DSC cell enclosure beneath the base of the DSC cavity in which the DSC sensor is installed. The dielectric plate is made of a high thermal conductivity material to substantially eliminate temperature variations across the plate. The connections between the thermocouple alloy wires and the pure metal traces on the dielectric plate are close to one another to further ensure that the connections are at the same temperature.

Figure 4:
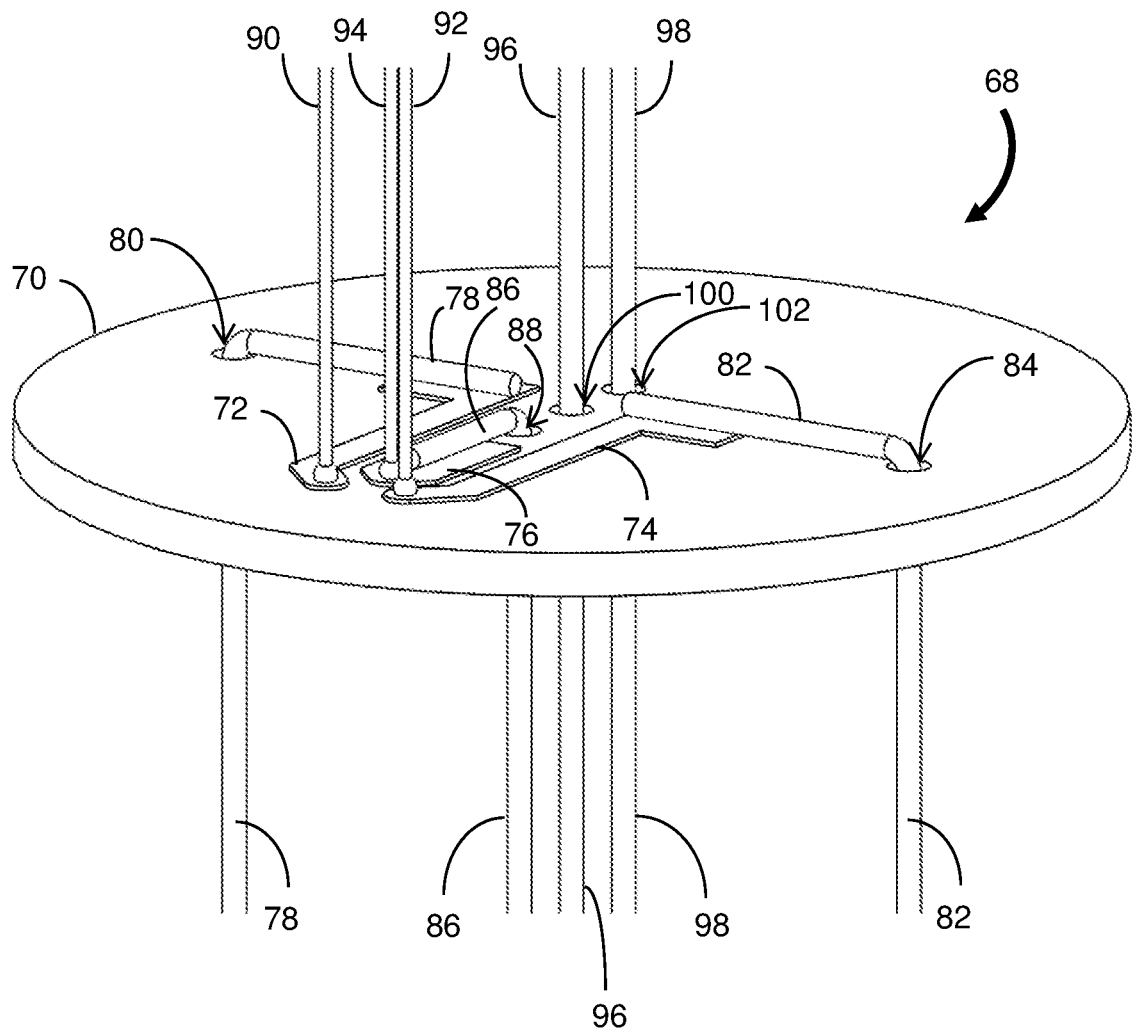
FIG. 4 is an axonometric view of an example of a DSC zone box.

FIG. 4 shows an axonometric view of an example of a DSC plate zone box 68 that includes a high thermal conductivity dielectric plate 70 having three gold traces 72, 74 and 76 applied to one face of the plate 70. A sample calorimeter E+ chromel thermocouple alloy wire 78 passes through a hole 80 in the dielectric plate 70. The wire 78 includes a bend so that a portion near the wire end is attached to one gold trace 72. Reference calorimeter E+ thermocouple alloy wire 82 passes through another hole 84 and includes a bend enabling the wire end to be attached to another gold trace 74. An E+ chromel thermocouple alloy wire 86 welded to the sensor base passes through another hole 88 and bends to permit attachment to another gold trace 76. Gold wires 90, 92 and 94 are attached at one end to gold traces 72, 74 and 76, respectively, and at their opposite ends to temperature difference measurement amplifiers (not shown). The temperature difference $\Delta T$ between the sample and reference calorimeters is measured between the ends of gold wires 90 and 92 and the temperature difference $\Delta T_0$ between the sample calorimeter and the sensor base is measured between the ends of gold wires 90 and 94. The E+ thermocouple alloy wire 96 and the E− thermocouple alloy wire 98 that are welded to the base of the sensor pass through the holes 100 and 102, respectively, and continue to their terminations at the temperature measurement amplifier (not shown) where reference junction compensation is applied. The temperature $T_0$ of the sensor base is measured between the E+ and E− thermocouple wires 96 and 98. The dielectric plate 70 is formed of a high thermal conductivity ceramic. In a preferred embodiment, the thermally conductive ceramic is beryllium oxide (BeO). In an alternative embodiment, the zone box plate is made of aluminum nitride (AlN). The gold traces 72, 74 and 76 may be applied to the dielectric plate 70 using suitable processes that are well-known in the fabrication of hybrid electric circuits, including vapor deposition (thin film), screen printing (thick film) and direct bonding (solid state reaction bonding or diffusion bonding) or combinations thereof. In preferred embodiments, direct bonding or thin film combined with direct bonding is used to apply the gold traces 72, 74 and 76 to the dielectric plate 70. The chromel E+ thermocouple wires 78, 82 and 86 can be attached to the gold traces 72, 74 and 76, respectively, using thermocompression bonding, parallel gap welding or other suitable processes. The gold wires 90, 92 and 94 can be attached to the gold traces 72, 74 and 76, respectively, using thermocompression bonding or other suitable processes.

Figure 5:
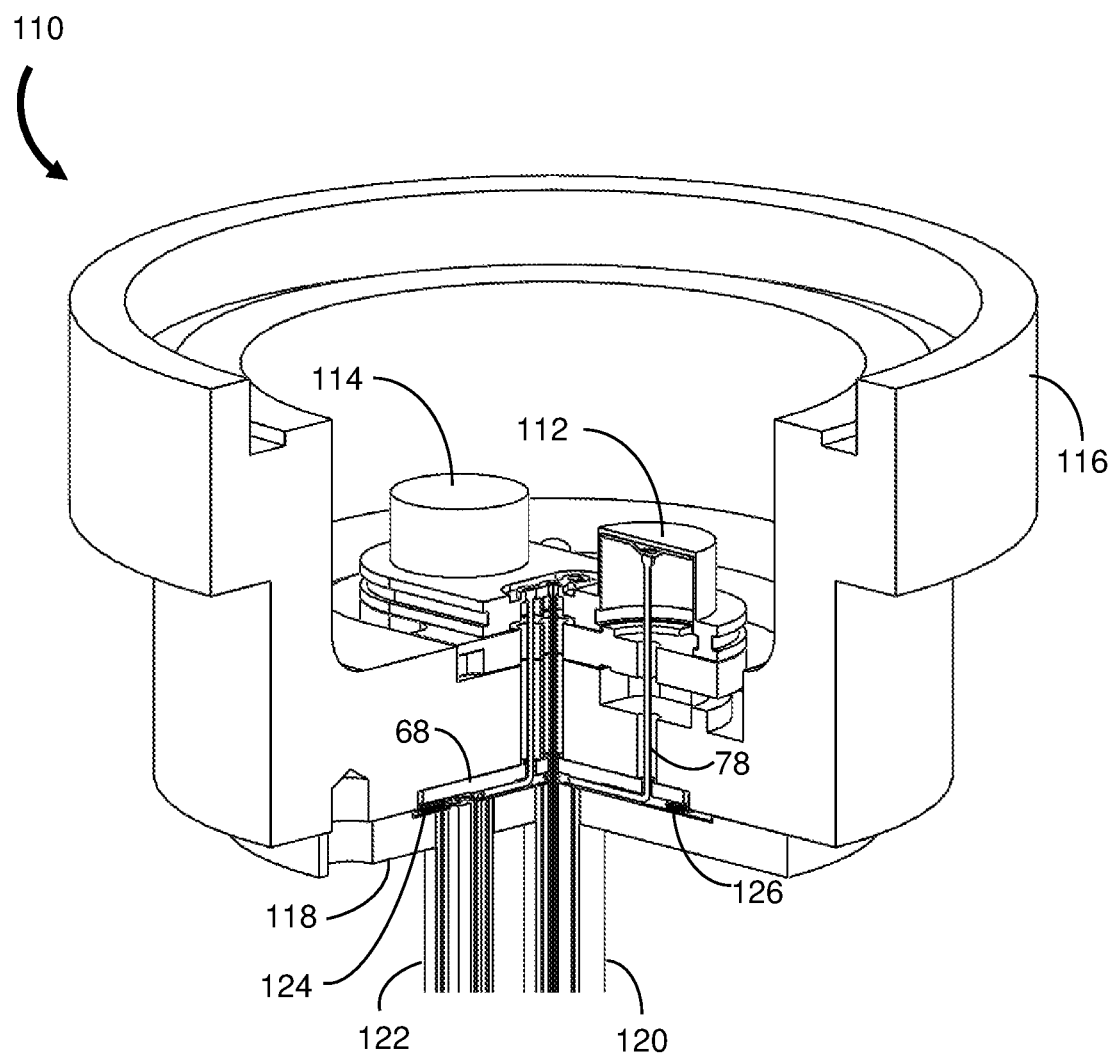
FIG. 5 is a partial cutaway view of a DSC cell that includes the zone box of FIG. 4.

Reference is also made to FIG. 5 which shows a partial cutaway view of a DSC cell 110 that includes the zone box 68 shown in FIG. 4, a sample calorimeter 112 and a reference calorimeter 114. The zone box 68 is disposed in a shallow recess on the underside of the DSC enclosure 116 beneath the DSC sensor assembly. The recess is covered by cover plate assembly affixed to the bottom of the DSC enclosure 116 to thereby enclose the dielectric plate 70, the gold traces 72, 74 and 76 and the connections between thermocouple wires 78, 82 and 86, gold traces 72, 74 and 76 and gold lead wires 90, 92 and 94. The cover plate assembly includes a cover plate 118 to which are attached a $T_O$ thermocouple protection tube assembly 120 and a ΔT and $\Delta T_O$ lead wire protection tube assembly 122. An electrical insulation layer 124 is installed between the inside surface of the cover plate 118 and the zone box 68 and attached wires 90, 92, 94, 96 and 98 to electrically insulate the wires and gold traces 72, 74 and 76 from the cover plate 118. A stack 126 of thin electrically insulating layers is installed between the insulation layer 124 and the zone box 68. The stack 126 of insulators presses against the dielectric plate 70 of the zone box 68 to hold it firmly against the DSC enclosure 116 within the recess to ensure high thermal conductivity therebetween. Thus, the temperature of the dielectric plate 70 is the same as the temperature of the DSC enclosure 116. As installed, the gold traces 72, 74 and 76 are on the side of the dielectric plate 70 opposite the DSC sensor. The sample calorimeter E+ chromel wire 78 exits the DSC sensor beneath the sample calorimeter 114, passes through an opening in the DSC enclosure and the through hole 80 in the dielectric plate 70 and bends to enable attachment to the gold trace 72. The reference calorimeter E+ chromel wire 82 exits the DSC sensor beneath the reference calorimeter 114, passes through the bottom of the DSC enclosure and the hole 84 in the dielectric plate 70 and bends to attach to the gold trace 74. The E+ chromel $\Delta T_O$ wire 86 passes through the sensor base, a hole through the bottom of the DSC enclosure 116 and the hole 88 in the dielectric plate 70 and makes a right-angle bend to attach to the gold trace 76. The E+ chromel $T_O$ thermocouple wire 96 welded to the DSC sensor base passes through the sensor base, a hole through the bottom of the DSC enclosure 116 and the hole 100 in the dielectric plate 70 to exit the DSC assembly via the $T_O$ thermocouple protection tube assembly 120. The E− constantan $T_O$ thermocouple wire 98 welded to the sensor base follows a similar path through the sensor base, the DSC enclosure 116 and the hole 102 in the dielectric plate 70 to exit the DSC assembly via the $T_O$ thermocouple protection tube assembly 120. The gold wire 94 is connected to the gold trace 76 and exits the DSC cell assembly via the ΔT and $\Delta T_O$ lead wire protection tube assembly 122. The gold wires 90 and 92 are connected to gold traces 72 and 74, respectively, and exit the DSC cell assembly via the ΔT and $\Delta T_O$ lead wire protection tube assembly 122. The $T_O$ thermocouple protection tube assembly 120 and the ΔT and $\Delta T_O$ lead wire protection tube assembly 124 protect the enclosed wires and stretch the temperature gradients on the $T_O$ thermocouple wires 96 and 98 to reduce the effects of inhomogeneity on the $T_O$ temperature measurement. Both protection tube assemblies 120 and 122 are constructed similarly and include ceramic insulating tubes having a plurality of small diameter holes parallel to the tube axis. The ceramic tubes are enclosed by a high thermal conductivity metal tube that is joined to the cover plate 118 by brazing. The thermocouple wires and lead wires pass through the small diameter holes in the ceramic insulating tubes. The protection tubes assemblies 120 and 122 terminate close to the terminals of the amplifier circuits of the DSC measurement circuit board (not shown).

In another embodiment, a zone box for a DSC instrument has a layered construction and includes a plurality of separate sheets of positive or negative thermocouple alloy that match the positive or negative thermocouple alloy of the DSC sensor. The sheets are disposed between two high thermal conductivity electrical insulator layers to form a layered construction zone-box. Each of the positive or negative thermocouple wires from the DSC sensor assembly is electrically coupled (e.g., welded) to one of the sheets and a pure metal lead wire is also electrically coupled to each sheet. The arrangement of the two insulator layers and the thermocouple alloy sheets is installed within a shallow cavity in the DSC enclosure beneath the base of the DSC cavity in which the DSC sensor is installed. The connections between the alloy thermocouple sheets and the pure metal wires on each of the sheets are located close to each other to further ensure that all the connections are at the same temperature.

Figure 6:
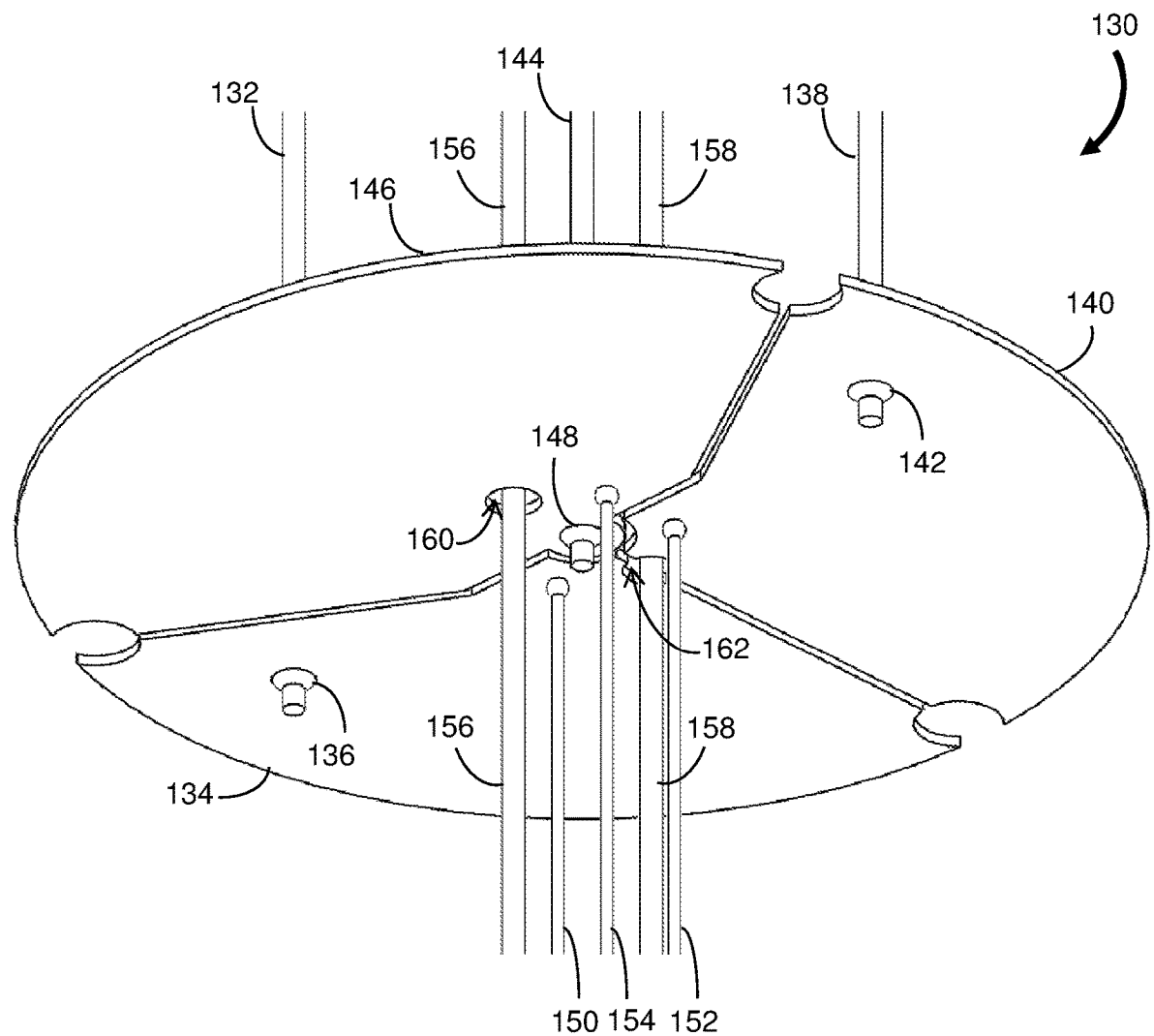
FIG. 6 is an axonometric view of an example of a zone box having a layered construction that includes three thermocouple alloy sheets.

FIG. 6 is an axonometric view of an example of a zone box 130 having a layered construction comprising three thermocouple alloy sheets 134, 140 and 146. The three sheets are separated from each other by a gap to maintain electrical isolation from each other. The zone box 130 further includes two thermally conductive electrical insulator layers (not shown to improve clarity) disposed on opposite sides of the sheets 134, 140 and 146.

A sample calorimeter E+ thermocouple alloy wire 132 passes through a sample E+ thermocouple alloy sheet 134 from above and is welded to the underside at position 136. A reference calorimeter E+ thermocouple alloy wire 138 passes through reference E+ thermocouple alloy sheet 140 from above and is welded to the underside at position 142. The calorimeter base E+ thermocouple alloy wire 144 passes through base E+ thermocouple alloy sheet 146 from above and is welded to the underside at position 148.

Gold lead wires 150, 152 and 154 are welded to thermocouple alloy sheets 134, 140 and 146, respectively. The E+ and E-thermocouple wires 156 and 158 that are welded to the base of the sensor pass through clearance holes 160 and 162, respectively. The gold lead wires 150, 152 and 154 and thermocouple wires 156 and 158 are located at five of the six positions equally spaced on a circle having a diameter that corresponds to five of the six bores through a six-bore ceramic insulating tube (not shown). Thus, the gold lead wires 150, 152 and 154 are situated close to one another so that the connections between the pure metal wires and the thermocouple alloy sheets 134, 140 and 146 are close to one another. In addition, all five wires are located to exit the DSC cell through a signal wire protection tube assembly (not shown) that includes the six-bore ceramic tube.

Figure 7:
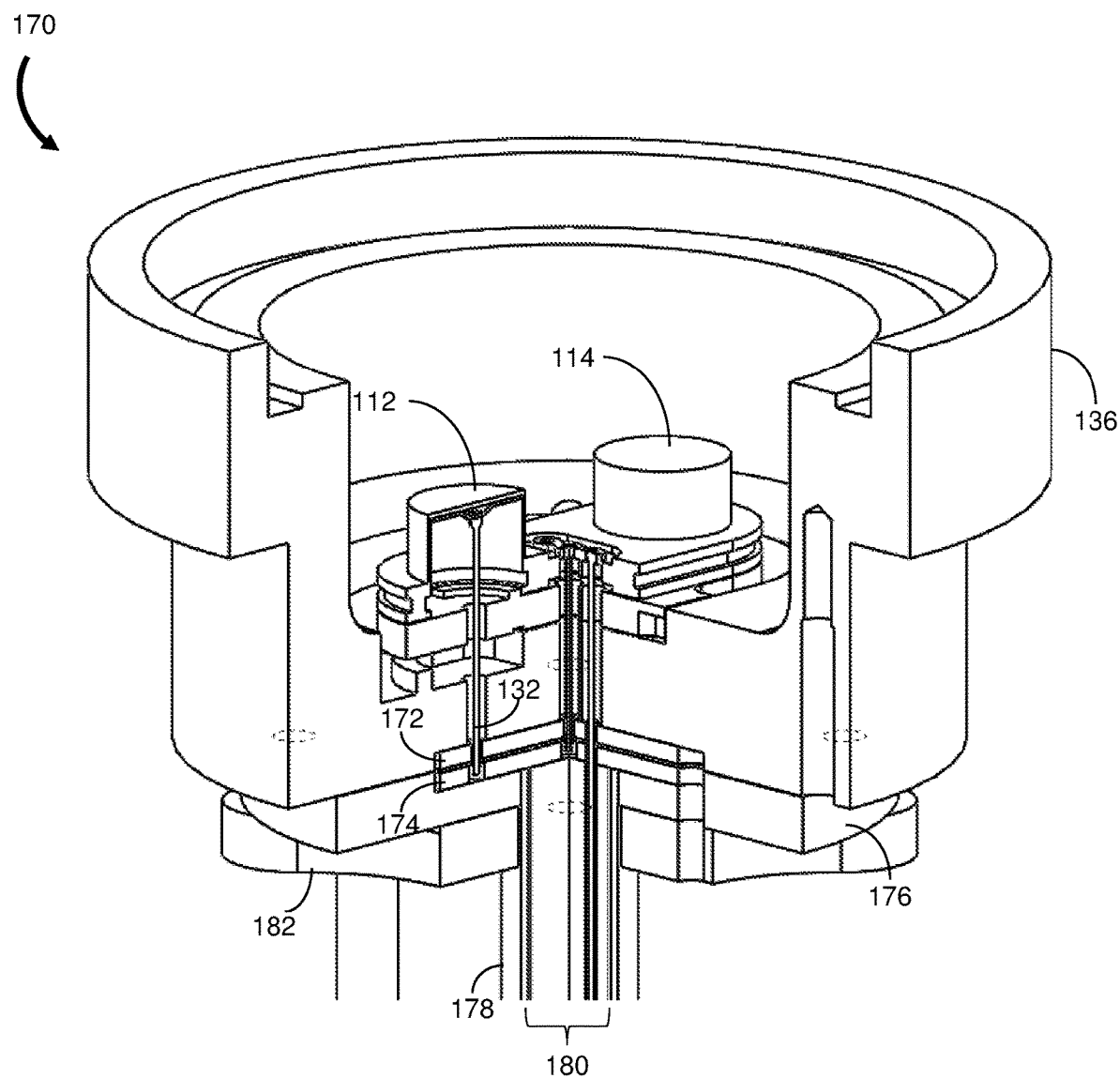
FIG. 7 is a partial cutaway view of a DSC cell that includes the zone box of FIG. 6

Reference is also made to FIG. 7 which shows a partial cutaway view of a DSC cell 170 that includes the zone box 130 of FIG. 6. The sample calorimeter 112 is cutaway to show the E+ thermocouple wire 132 as connected to E+ thermocouple alloy sheet 134. Features shown and described for the sample calorimeter 112 are the same for the reference calorimeter 114. Thermocouple alloy sheets 134, 140 and 146 are interposed between two thermally conductive electrical insulator layers: inner insulator 172 and outer insulator 174. The thermally conductive electrical insulator layers 172 and 174 are preferably BeO layers although other high thermal conductivity ceramic layers such as AlN may be used. Inner insulator 172 is installed in a recess that is formed in the bottom surface of the DSC enclosure 136 directly beneath the DSC sensor assembly. The inner and outer insulators 172 and 174 and the thermocouple alloy sheets 134, 140 and 146 are enclosed and held in place by a cover plate assembly that is affixed to the bottom of the DSC enclosure 136. The cover plate assembly includes a cover plate 176 to which is attached a signal wire protection tube assembly 178. The assembly 178 surrounds a six-bore ceramic insulator tube 180 which encloses the thermocouple wires 156 and 158 and temperature difference signal wires 150, 152 and 154. One of the bores of the insulator tube 180 is not used. The cover plate 176 is held in place by a pressure plate 182 that is fastened to the bottom surface of the DSC cell enclosure 136. The pressure plate 178 applies pressure uniformly to the inner and outer insulators 172 and 174 and the thermocouple alloy sheets 134, 140 and 146 to insure efficient heat exchange between the DSC cell enclosure 136 and these components. The sample E+ thermocouple wire 132 passes through the DSC enclosure 136, inner insulator 172 and thermocouple alloy sheet 134 and is welded to the underside of the thermocouple alloy sheet 134. The reference E+ thermocouple wire 138 is similarly disposed and is welded to the underside of the thermocouple alloy sheet 140. The calorimeter base E+ thermocouple wire 144 is welded to the center of the base of the DSC sensor and extends downward through the base, the inner insulator 172 and the base thermocouple alloy sheet 146. The calorimeter base E+ thermocouple wire 144 is welded to the underside of the base thermocouple alloy sheet 146.

Figure 8A:
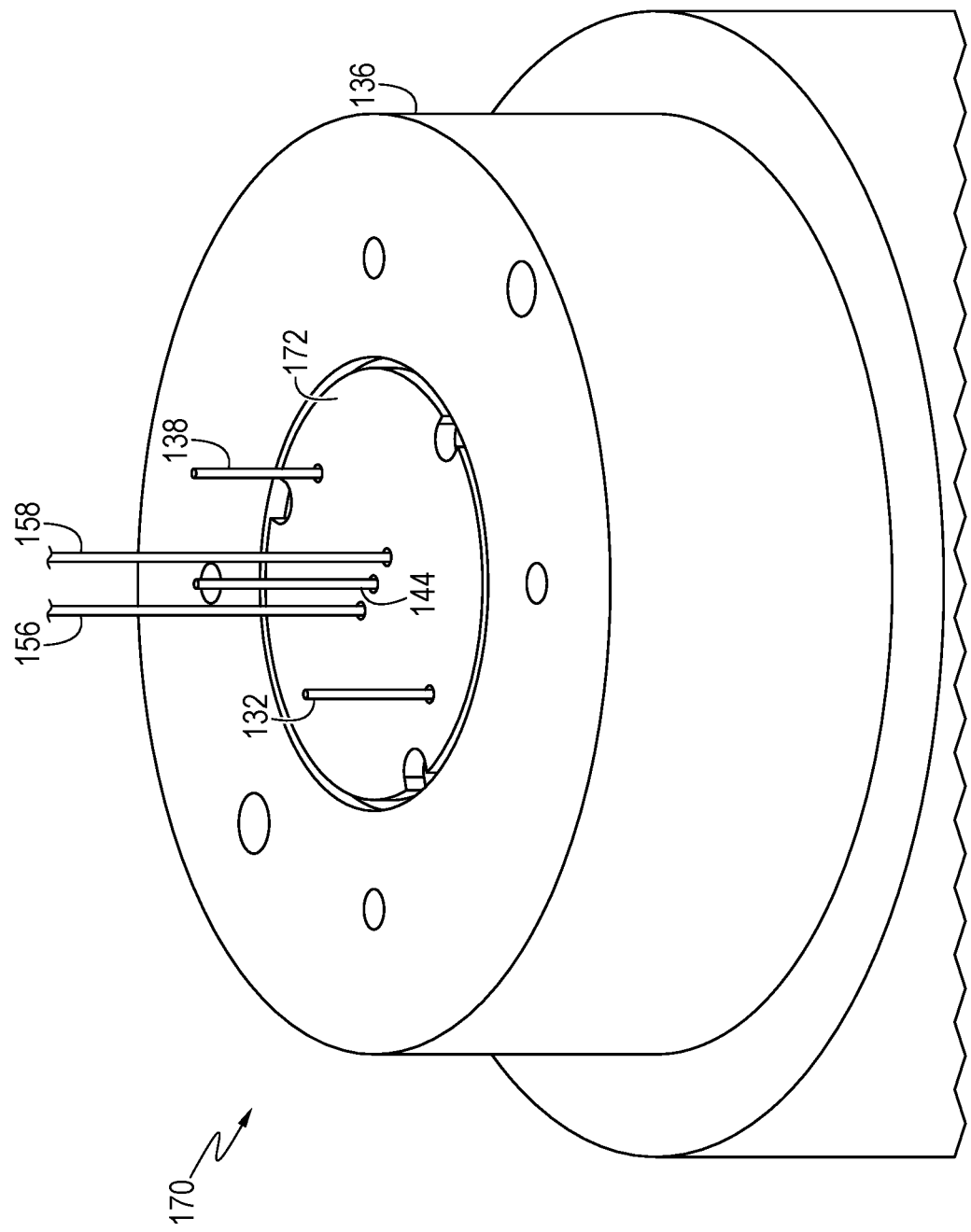
FIGS. 8A to 8D are perspective bottom views of the DSC cell of FIG. 7 showing the layered construction of the zone box.
Figure 8B:
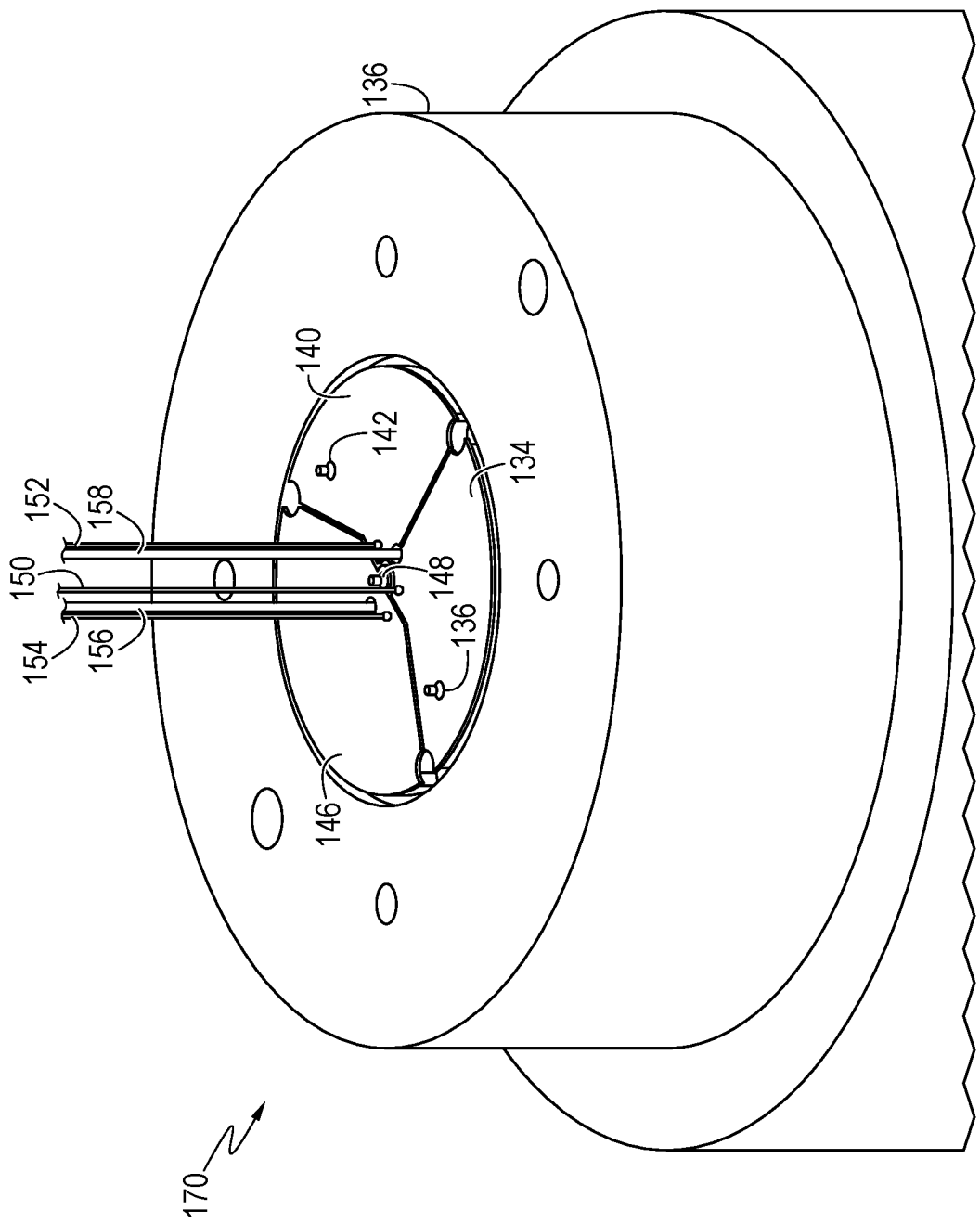
Figure 8C:
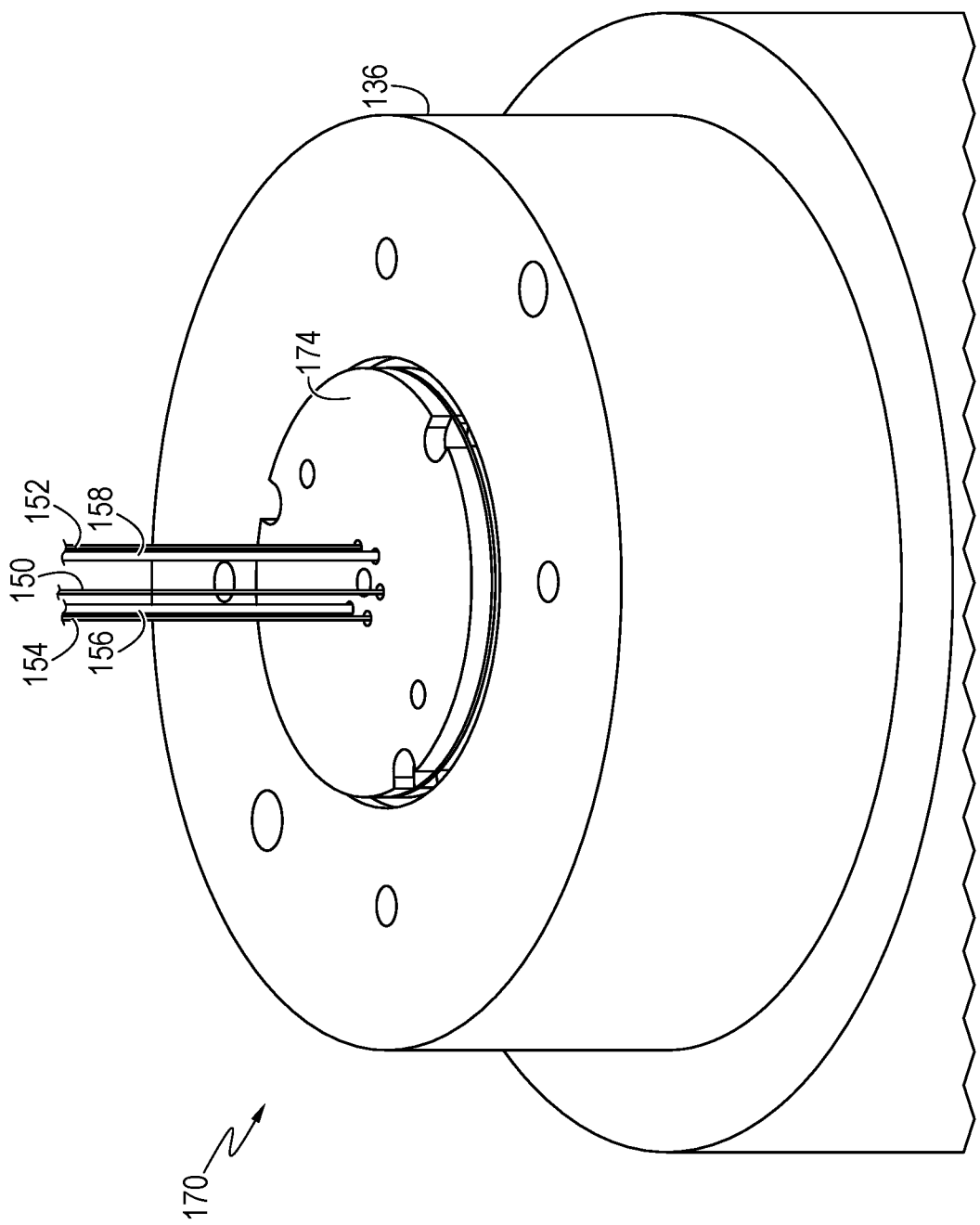
Figure 8D:
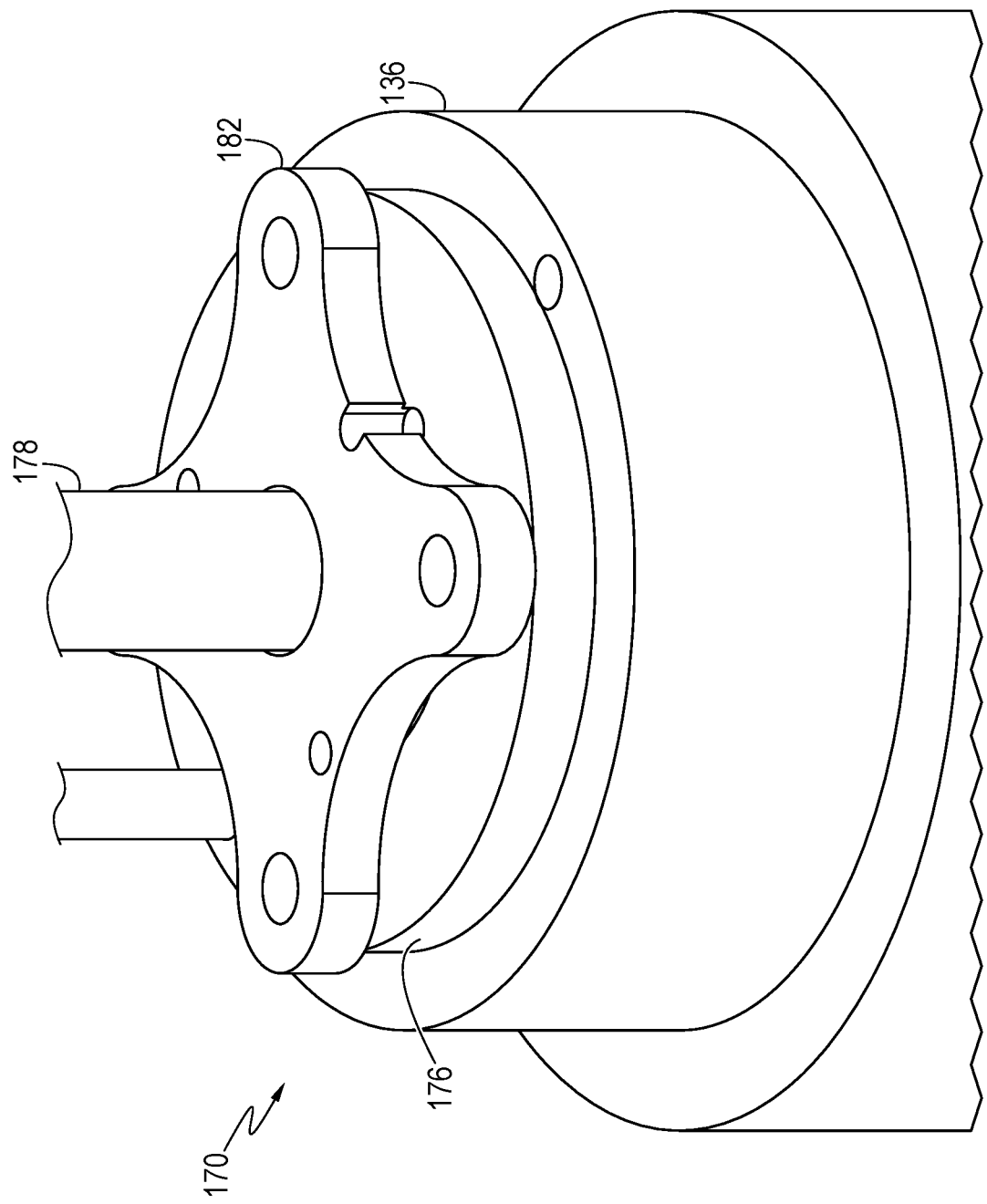

FIGS. 8A to 8D illustrate a perspective bottom view of the DSC cell 170 showing the layered construction of the zone box 130 of FIGS. 6 and 7. The inner insulator 172 is shown inside the recessed region of the DSC enclosure 136 in FIG. 8A and FIG. 8B shows the thermocouple alloy sheets 134, 140 and 146 covering the inner insulator 172. FIG. 8C shows the outer insulator 174 such that the thermocouple alloy sheets 134, 140 and 146 are sandwiched between the inner and outer insulators 172 and 174. FIG. 8D shows the DSC cell 170 with the cover plate 176 and signal wire protection tube assembly 178 attached. The pressure plate 182 is fastened to the bottom surface of DSC cell enclosure 136 and holds the cover plate 176 in position.

Figure 9:
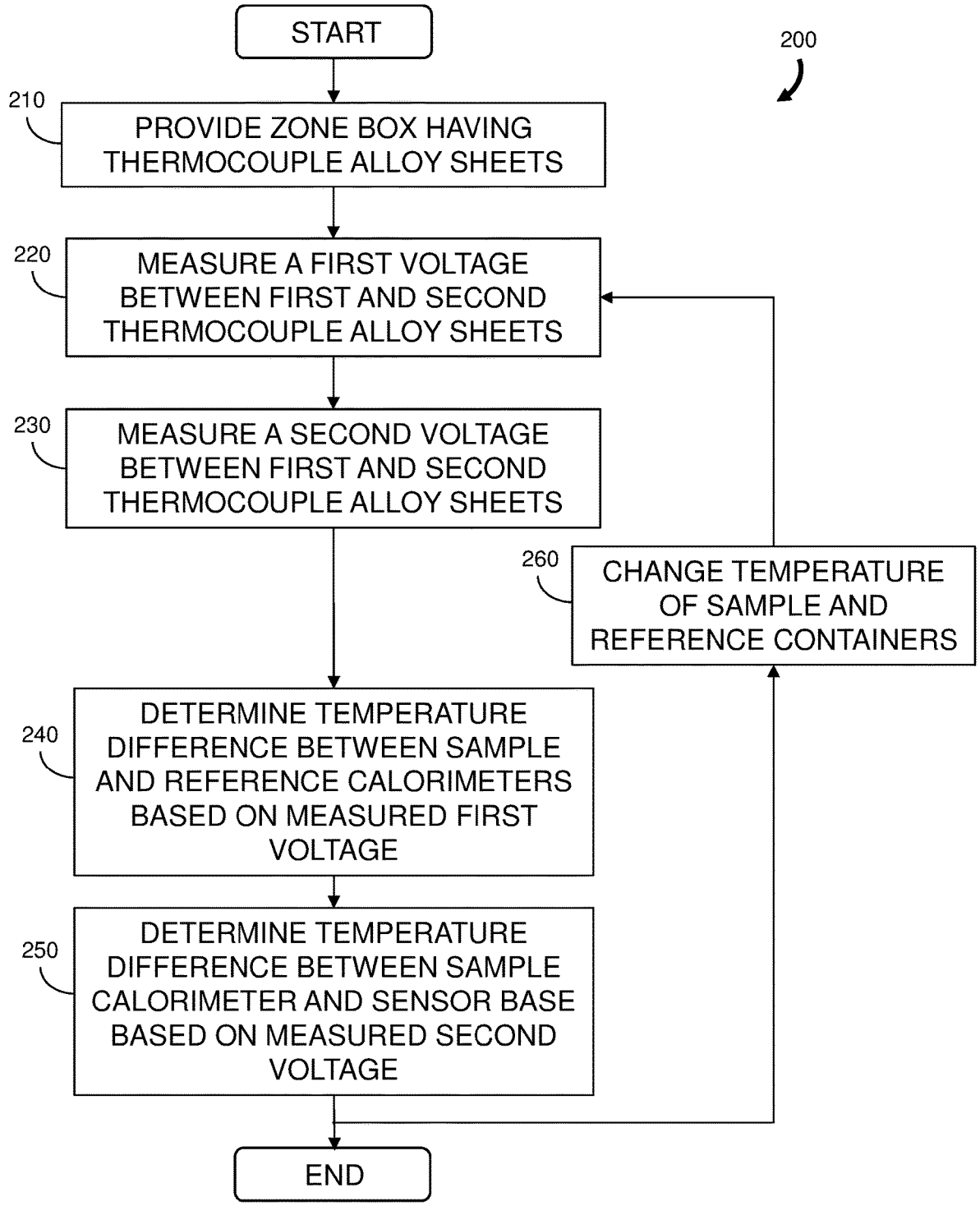
FIG. 9 is a flowchart representation of an embodiment of a method for performing a differential scanning calorimeter measurement.

FIG. 9 is a flowchart representation of an embodiment of a method 200 for performing a differential scanning calorimeter measurement. Reference is also made to the DSC instrument and zone box as described with respect to FIGS. 6 to 8D with respect to the provision (step 210) of a zone box and the subsequent steps of the method 200. In step 220, a first voltage is measured between the first thermocouple alloy sheet 134 and the second thermocouple alloy sheet 140 and, in step 230, a second voltage is measured between the first thermocouple alloy sheet 140 and the third thermocouple alloy sheet 146. A temperature difference between the sample calorimeter 112 and the reference calorimeter 114 is determined (step 240) based on the measured first voltage. Similarly, a temperature difference between the sample calorimeter 112 and the sensor base is determined (step 250) based on the measured second voltage. In some embodiments the first and second voltages are measured between two pure metal wires (e.g., gold wires) where one of the wires is electrically coupled to thermocouple alloy sheet 134 and the other wire is electrically coupled to thermocouple alloy sheet 140 or 146.

The method may further include changing (step 260) the temperatures of the sample container and the reference container and then again measuring (steps 220 and 230) the first and second voltages and determining (steps 240 and 250) the temperature difference between the sample calorimeter 112 and the reference calorimeter 114 and the temperature difference between the sample calorimeter 112 and the sensor base. Steps 260 and then steps 220 through 250 may be repeated multiple times so that the temperature differences may be determined during a ramping of the temperature.

While various examples have been shown and described, the description is intended to be exemplary, rather than limiting and it should be understood by those of ordinary skill in the art that various changes in form and detail may be made therein without departing from the scope of the invention as recited in the accompanying claims.

What is claimed is:

1. A zone box for a differential scanning calorimeter, comprising:
   a first thermally conductive electrical insulator layer;
   a second thermally conductive electrical insulator layer;
   a plurality of thermocouple alloy sheets interposed between the first thermally conductive electrical insulator layer and the second thermally conductive electrical insulator layer, the plurality of thermocouple alloy sheets each formed of a same thermocouple alloy; and
   a plurality of thermocouple alloy wires each electrically coupled to a respective one of the thermocouple alloy sheets and formed of a same thermocouple alloy as the respective one of the thermocouple alloy sheets.

2. The zone box of claim 1 wherein at least one of the thermocouple alloy sheets and the first and second thermally conductive electrical insulator layers include at least one hole to pass at least one additional thermocouple alloy wire.

3. The zone box of claim 1 wherein each of the thermocouple alloy wires is electrically coupled to a side of a respective one of the thermocouple alloy sheets and wherein the zone box further comprises, for each of the thermocouple alloy sheets, a pure metal wire electrically coupled to a same side of the respective one of the thermocouple alloy sheets.

4. The zone box of claim 3 wherein each of the pure metal wires is electrically coupled to the respective one of the thermocouple alloy sheets at a location that is proximate to the locations where the other pure metal wires are electrically coupled to the other thermocouple alloy sheets.

5. The zone box of claim 3 wherein each of the pure metal wires is a gold wire.

6. The zone box of claim 1 wherein the plurality of thermocouple alloy wires comprises a first thermocouple alloy wire included in a first thermocouple disposed to measure a temperature of a sample calorimeter and a second thermocouple wire included in a second thermocouple disposed to measure a temperature of a reference calorimeter.

7. The zone box of claim 6 wherein the plurality of thermocouple alloy wires further comprises a third thermocouple wire included in a thermocouple disposed to measure a temperature of a differential scanning calorimeter sensor base.

8. The zone box of claim 1 wherein at least one of the first and second thermally conductive electrical insulator layers comprises a ceramic material.

9. The zone box of claim 8 wherein the ceramic material is beryllium oxide.

10. The zone box of claim 8 wherein the ceramic material is aluminum nitride.

11. The zone box of claim 1 wherein each of the first and second thermally conductive electrical insulator layers has a thermal conductivity of at least 100 W/mK.

12. A method for performing a differential scanning calorimeter measurement, the method comprising the steps of:
   (a) providing a zone box for a differential scanning calorimeter having a sample calorimeter, a reference calorimeter and a sensor base, the zone box including a first thermocouple alloy sheet, a second thermocouple alloy sheet and a third thermocouple alloy sheet, and a plurality of thermocouple alloy wires each electrically coupled to a respective one of the thermocouple alloy sheets, each of the thermocouple alloy sheets being formed of a same thermocouple alloy;

(b) measuring a first voltage between the first thermocouple alloy sheet and the second thermocouple alloy sheet; and (c) determining a temperature difference between the sample calorimeter and the reference calorimeter based on the measured first voltage.

13. The method of claim 12 wherein the measuring of the first voltage comprises measuring a voltage between two pure metal wires each in electrical communication with a respective one of the first and second thermocouple alloy sheets.

14. The method of claim 12 further comprising:

(d) changing a temperature of a sample container and a temperature of a reference container of the differential scanning calorimeter; and (e) repeating steps (b) and (c).

15. The method of claim 14 further comprising iteratively performing steps (d) and (e).

16. The method of claim 12 further comprising:

measuring a second voltage between the first thermocouple alloy sheet and the third thermocouple alloy sheet; and determining a temperature difference between the sample calorimeter and the sensor base based on the measured second voltage.

17. A zone box for a differential scanning calorimeter, comprising:

a first thermally conductive electrical insulator layer;

a second thermally conductive electrical insulator layer;

a plurality of thermocouple alloy sheets interposed between the first thermally conductive electrical insulator layer and the second thermally conductive electrical insulator layer; and a plurality of thermocouple alloy wires each electrically coupled to a respective one of the thermocouple alloy sheets and formed of a same thermocouple alloy as the respective one of the thermocouple alloy sheets, wherein the zone box further comprises, for each of the thermocouple alloy sheets, a pure metal wire electrically coupled to a same side of the respective one of the thermocouple alloy sheets.

* * * * *